March 23, 1926.
C. G. DRESCHER ET AL
1,577,454
ANTISKID CHAIN FOR MOTOR VEHICLES
Filed June 1, 1925
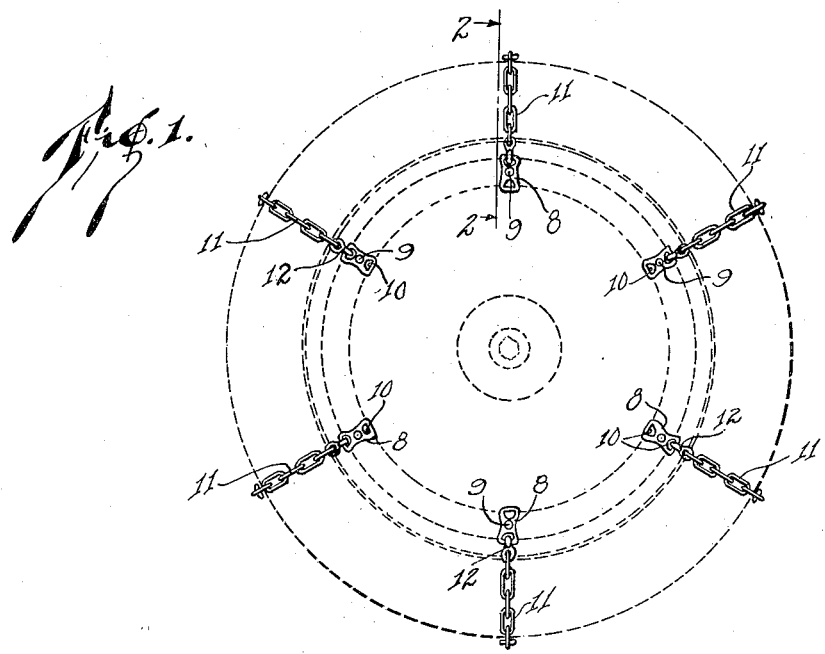
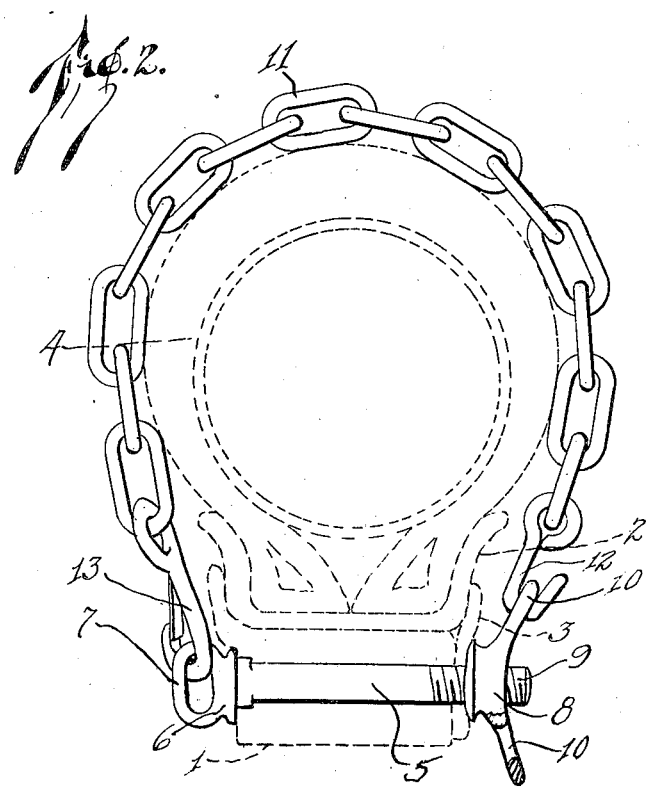
INVENTORS
C. G. Drescher
BY C. E. Orrison
Munn & Co
ATTORNEYS Patented Mar. 23, 1926.

1,577,454

UNITED STATES PATENT OFFICE.

CLIFFORD G. DRESCHER AND CHESTER E. ORRISON, OF VILLA GROVE, ILLINOIS.

ANTISKID CHAIN FOR MOTOR VEHICLES.

Application filed June 1, 1925. Serial No. 34,119.

*To all whom it may concern:*

Be it known that we, CLIFFORD G. DRESCHER and CHESTER E. ORRISON, both citizens of the United States, and residents of Villa Grove, Douglas County, State of Illinois, have invented a new and useful Improvement in Antiskid Chains for Motor Vehicles, of which the following is a full, clear, and exact description.

Our invention relates to improvements in anti-skid chains for motor vehicles, and it consists in the combinations, constructions, and arrangements herein described and claimed.

An object of our invention is to provide an anti-skid chain of the character described which is adapted for disposition transversely across the tread of a motor-vehicle tire and which is attached at its opposite ends to a bolt extending transversely through the felly of the wheel upon which the tire is disclosed.

A further object of our invention is to provide a device of the character described in which especially novel means is employed for securing the chain to the bolt.

A further object of our invention is to provide a device of the character described in which the chain securing means performs the twofold function including the securing of the rim against removal from the felly of the wheel.

A further object of the invention is to provide a device of the character described which may be used in pairs upon the wheels or in which greater numbers of chains may be used, as desired.

A further object of the invention is to provide a device of the type described which is simple in construction, durable, and thoroughly practical commercially.

Other objects and advantages will appear in the following specification, and the novel features of the invention will be particularly pointed out in the appended claim.

Our invention is illustrated in the accompanying drawings forming part of this application, in which—

Figure 1 is a side elevation of an embodiment of the invention, and

Figure 2 is an enlarged view along the line 2—2 of Figure 1.

In carrying out our invention we make use of the ordinary type of motor vehicle felly 1 having a rim 2 secured thereto by means of a binding ring 3 which is ordinarily removably attached and secured to the felly 1 by the provision of a bolt projected transversely through the felly and through the ring 3, and provided with a nut which is turned down upon the bolt in close engagement with the ring.

A pneumatic tire 4 is carried upon the rim 2. Our invention provides for the replacement of the bolt described with a special bolt 5 forming a part of our improved chain-securing means.

This bolt 5 has a head 6 provided with an eye member 7. The shank of the bolt 5 is identical with the shank of the standard bolt employed for securing the ring 3 to the felly 1.

A nut 8 is disposed upon the threaded portion 9 of the bolt 5 and is of special construction. This nut has a pair of diametrically opposed eye portions 10, whereby one of the eye portions may always be brought to a position nearest to the tire 4 by not greater than a one-half rotation of the nut 8.

We provide a chain 11 consisting of a plurality of sturdy galvanized links having a hook member 12 secured in one end and a snap fastener 13 disposed at the opposite end of the chain.

The chain 11 is just sufficiently long as to permit the snap fastener 13 to engage with the adjacent eye member 7 of the head 6 when the hook 12 has been previously engaged with the adjacent eye 10 of the nut 8, as shown in Figure 2.

From the foregoing description of the various parts of the device the operation thereof may be readily understood. Ordinarily the chain 11 with its hook 12 and snap fastener 13 secured thereto is carried in the tonneau of the car in some convenient place.

The bolts 5 with their special nuts 8 perform their normal function of securing the ring 3 in close engagement with the rim 2 to prevent the removal of the rim from the felly.

When it becomes necessary to employ chains, the driver will take as many of the chains as he wishes to dispose on each of the wheels and secure the hook members 12 in engagement with the eye portions 10, whereupon the snap fasteners 13 are engaged with the adjacent eyes 7 of the bolts 5. The vehicle is now ready for use with its chains.

The chain 11 is sufficiently taut to prevent dislodgment of the hook member 12 from the eye 10 when the snap fastener 13 is engaged with the eye 7.

Our improved anti-skid chain is particularly useful inasmuch as the ordinary driver neglects attending to his anti-skid chains or other devices ordinarily used until the roads become excessively muddy, which makes the disposition of the ordinary type of anti-skid chain upon the wheel a difficult and disagreeable task.

This is not true in the case of the installation of our improved anti-skid chain, since engagement of the hooks and snap fasteners 13 is comparatively simple, regardless of the condition of the tread of the tire.

We claim:

An anti-skid chain for motor vehicles comprising a bolt having an eye member at the head thereof and arranged for projection transversely through the felly of a motor vehicle wheel, a nut for securing the bolt upon the vehicle wheel, said nut having a pair of diametrically opposed and radially extending eye members, a chain arranged for disposition over the tread of a vehicle tire carried by the wheel, and means at either end of the chain for engaging with the eye at the head of the bolt and one of the eyes on the nut, respectively.

CLIFFORD G. DRESCHER.
CHESTER E. ORRISON.